May 7, 1968  J. M. ELEK  3,381,982
PLASTIC FITTING ASSEMBLY
Filed June 6, 1966
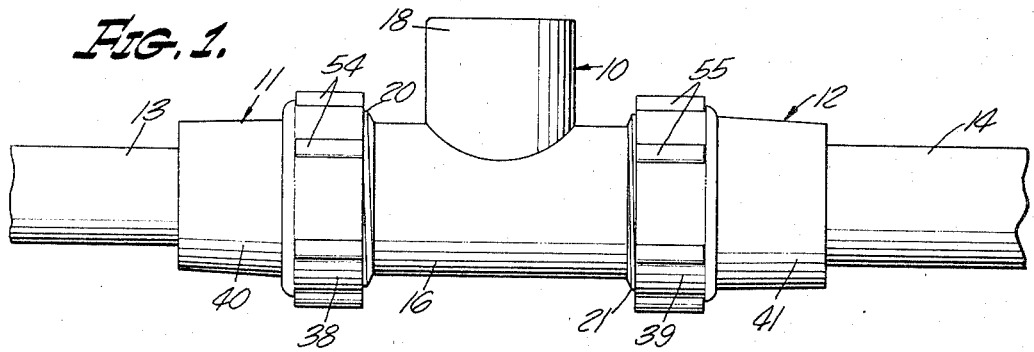
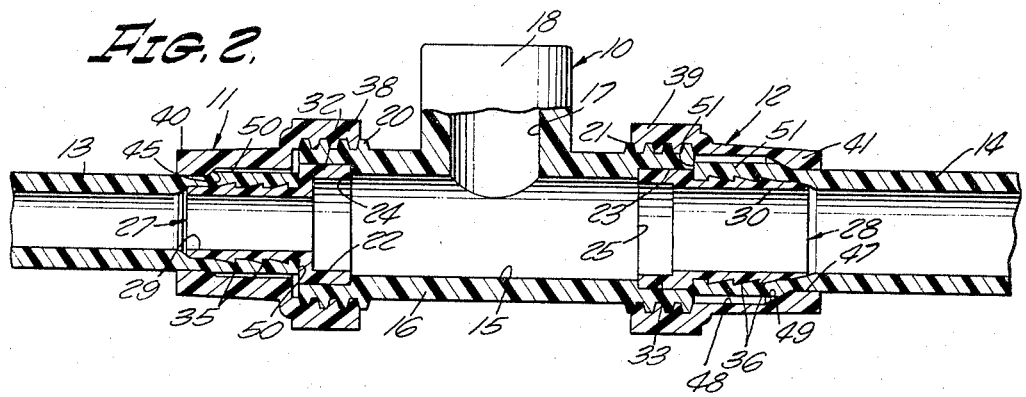
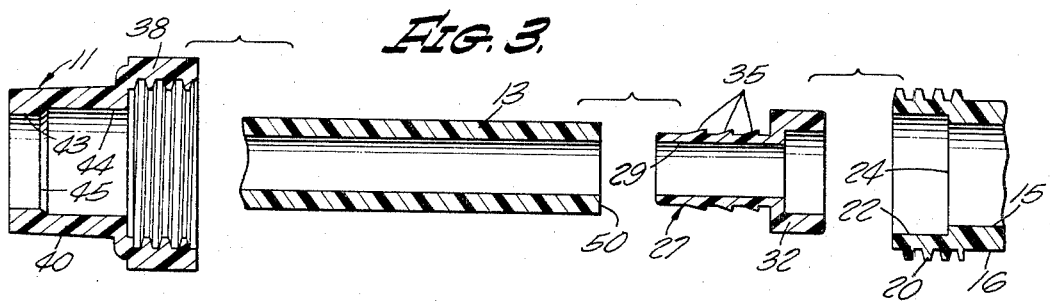
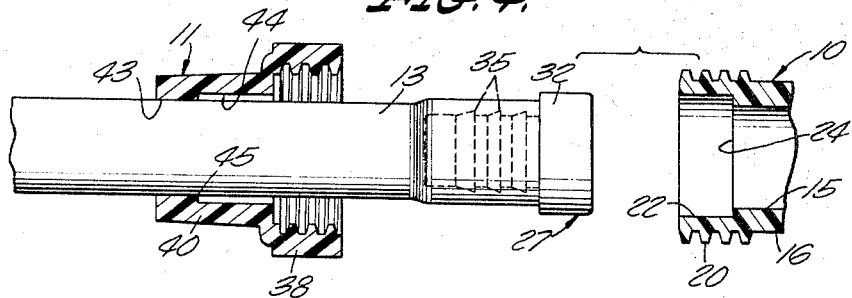
INVENTOR.
JOHN M. ELEK
BY Lyon & Lyon
ATTORNEYS

United States Patent Office 3,381,982
Patented May 7, 1968

3,381,982
PLASTIC FITTING ASSEMBLY
John M. Elek, Los Angeles, Calif., assignor to Armstrong Plastic Specialties Co., Los Angeles, Calif., a corporation of California
Filed June 6, 1966, Ser. No. 555,394
2 Claims. (Cl. 285—156)

ABSTRACT OF THE DISCLOSURE

A plastic fitting assembly including a fitting for accommodating different size hoses. The assembly includes a fitting, a pair of inserts and a pair of nuts. The fitting includes recessed shoulders which are abutted by flanged ends of the inserts, the other ends of the inserts being inserted into the ends of hoses. The nuts encircle the hose and each includes a collar portion for engaging the outer surface of the respective hoses to force the flanges of the inserts into a sealed relationship with the fitting and for sealing the hoses with the inserts.

---

This invention relates to a fitting assembly for interconnecting hoses or tubes and more particularly to an improved plastic fitting assembly for providing a simple and effective coupling with different size rubber or plastic hoses or tubes.

Numerous fittings and couplings formed of either metal or plastic have been devised for interconnecting hoses and tubes. In order to provide a good fluid tight seal, various washers, adhesives and other means generally have been required in fitting or coupling assemblies. Some approaches in the construction of such fitting assemblies have been proposed wherein the number of individual components required for effecting a good seal have been reduced, but generally the proposed configurations have been relatively complex in shape thereby increasing the difficulty and cost of manufacture thereof. In particular, such prior art fittings generally have been relatively complex and designed to accommodate only a single size hose or tube.

In accordance with the concepts of the present invention, a fitting assembly is provided including a fitting, inserts and nuts. A single fitting can accommodate hoses of different sizes by the use of different inserts and nuts. The assembly is simple in construction and preferably is manufactured of plastic. The configuration of the nut enables a good seal to be obtained between a hose and the fitting without the requirement of special sealing means, adhesives or tightening tools.

Accordingly, it is a principal object of the present invention to provide an improved fitting assembly which can accommodate rubber or plastic hoses or tubes in a wide range of sizes.

It is an additional object of the present invention to provide an improved fitting assembly which is simple and economical to manufacture.

It is a further object of the present invention to provide an improved fitting assembly requiring relatively few parts which may be formed of a plastic material, and which readily accommodates hoses and tubes of various sizes.

These and other objects and features of the present invention will become more apparent through a consideration of the following description taken in conjunction with the drawing in which:

FIGURE 1 is a side elevational view of a fitting assembly according to the present invention with hoses of different sizes coupled therewith;

FIGURE 2 is a cross-sectional view of the assembly shown in FIGURE 1; and

FIGURES 3 and 4 comprise exploded views illustrating the manner in which a hose is coupled with a fitting.

Referring now to the drawing, an exemplary fitting assembly according to the concepts of the present invention is illustrated in the form of a T fitting 10, and nuts 11 and 12 coupled therewith. Hoses 13 and 14 are shown coupled with the fitting 10. The fitting 10 has a passageway 15 in the base or arms 16 to allow communication between the hoses 13 and 14, and a passageway 17 in the upright or leg portion 18 of the fitting. Each end of the base member 16 is externally threaded at 20 and 21. The ends also have respective enlarged recesses or openings 22 and 23 defining respective internal shoulders 24 and 25.

The fitting assembly includes adapter inserts 27 and 28. The insert 27 has a bore 29 therethrough having a diameter substantially equal to the internal diameter of the hose 13 so as not to diminish the flow of fluid or cause a pressure drop. Similarly, the insert 28 has a bore 30 therethrough of a diameter substantially idential to the internal diameter of the hose 14. The inserts 27 and 28 terminate in respective flanges 32 and 33 which are adapted to fit within the respective recesses 22 and 23 with the ends thereof abutting the respective shoulders 24 and 25 to provide a seal therewith. The insert 27 includes a plurality of conical ridges 35, and the insert 28 includes similar conical ridges 36. It will be noted that although the external diameter of the flanges 32 and 33 of the respective inserts 27 and 28 is the same, the diameter of the bores 29 and 30 and the external diameter of the rigid portions are different thereby enabling the accommodation and coupling of different size hoses 13 and 14 to the fitting 10.

The nuts 11 and 12 include flanged portions 38 and 39 which are internally threaded to allow the nuts to be screwed onto the threads 20 and 21 of the fitting 10. These nuts further include respective collar portions 40 and 41 extending from the respective flanged portions 38 and 39. Communicating bores 43 and 44 are provided in the nut 11 and define an inclined internal shoulder 45 therebetween. Similarly, communicating internal bores 47 and 48 are provided in the nut 12 and define an inclined internal shoulder 49 therebetween. The diameters of the bores 43 and 47 are larger than the respective outside diameters of the ridge portions 35 and 36 of the respective inserts 27 and 28, but less than the outside diameter of the respective hoses at the ends 50 and 51 thereof with the respective inserts 27 and 28 positioned therein.

In order to couple a hose 13 with the fitting 10, or "make-up" a joint, the nut 11 is slid over the hose 13, and the insert 27 is pushed into the end 50 of the hose. The ridges 35 cause the end 50 of the hose 13 to expand thereby forming a firm and tight connection between the hose and the insert. The flange 32 of the insert 27 is positioned within the recess 22 in the fitting 10, and the nut 11 is screwed onto the threads 20. The shoulder 45 in the collar portion 40 of the nut 11 engages the outer surface of the hose 13 and pulls the flange 32 of the insert 27 into a sealed position within the recess 22 and against the shoulder 24 in the fitting 10. The hose 14 is coupled with the fitting 10 in a similar manner. Relatively thick threads 20 and 21 are provided on the fitting 10, and similar threads in the nuts 11 and 12 for improved strength and ease of "make-up" of the joint. Protuberances 54 and 55 are provided on the periphery of the respective flanged portions 38 and 39 of the nuts 11 and 12 and facilitate drawing of these nuts onto the fitting 10 by hand. Each of the components of the fitting assembly, i.e., the fitting 10, nuts 11 and 12, and the inserts 27 and 28 may be formed of any suitable plastic material. The hoses 13 and 14 may be of rubber or plastic.

It will be apparent that the present invention provides an improved fitting assembly which allows a wide range of hose or tube sizes to be joined, or coupled thereto. The component parts of the assembly are relatively simple and inexpensive to manufacture, and enable the "make-up" of a sealed joint in a simple manner without the necessity of tools or adhesives. Also, the components are not damaged when assembled thereby readily allowing disassembly and reuse thereof.

The present embodiment of the invention is to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. A fitting assembly for rigidly coupling hoses, or the like, for providing a sealed fluid passageway between a fiting and hoses comprising a plastic fitting having a bore therethrough and recesses in the ends thereof communicating with said bore, said recesses being substantially identical and defining respective shoulders between said bore and said recesses, and said fitting having thick external threads on said ends thereof, a pair of plastic insert means for receiving the respective ends of a pair of hoses having different internal diameters and for mating with the respective recesses and shoulders in said ends of said fitting, said insert means comprising tubular members having respective bores therethrough substantially the same diameters as the respective internal diameters of hoses to be coupled with said fittings, both of said tubular members having a flange with an outside diameter substantially the same as the internal diameter of said recesses in said fitting and terminating in a face which abuts and forms a seal with the respective shoulders in said fitting, and a pair of plastic nut means each having a flanged portion with thick internal threads for engaging said respective external threads on said ends of said fitting, each of said nut means having a collar portion with inner and outer communicating bores therethrough defining a sharply inclined internal shoulder between said bores, the inclined internal shoulders serving to engage the outer surface of respective hoses and force said flange of said respective tubular members into a sealed relationship with said respective shoulders in said fitting, the outer bore of each of said nut means being of different diameter and each being larger than the outside diameters of said respective tubular members but less than the outside diameter of the ends of respective hoses when the respective tubular members are positioned therein, and the flanged portion of each of said nut means including a plurality of protuberances on the periphery thereof for facilitating hand threading and tightening of said nut means onto said fitting.

2. A fitting assembly for rigidly coupling hoses, or the like, for providing a sealed fluid passageway between a fitting and hoses comprising a plastic T fitting having a bore extending through the arms thereof and communicating with a bore in the leg thereof, said arms having respective ends with substantially identical recesses therein defining respective shoulders between said bore through the arms and said recesses, and said fitting having thick external threads on the ends thereof, a pair of plastic insert means for receiving the respective ends of a pair of hoses having different internal diameters and for mating with the respective recesses and shoulders in said ends of said fitting, said insert means comprising tubular members having respective bores therethrough substantially the same diameters as the respective internal diameters of hoses to be coupled with said fittings, both of said tubular members having a flange with an outside diameter substantially the same as the internal diameter of said recesses in said fitting and terminating in a face which abuts and forms a seal with the respective shoulders in said fitting, and a pair of plastic nut means each having a flanged portion with thick internal threads for engaging said respective external threads on said ends of said fitting, each of said nut means having inner and outer communicating bores of different diameters defining a sharply inclined internal shoulder between said bores, the inclined internal shoulders of said nut means serving to engage the outer surface of respective hoses and force said flange of said respective tubular members into a sealed relationship with said respective shoulders in said fitting, the outer bore of each of said nut means being of different diameter and each being larger than the outside diameters of said respective tubular members but less than the outside diameter of the ends of respective hoses when the respective tubular members are positioned therein, the inner bore of each of said nut means having a diameter larger than the outside diameter of the ends of respective hoses when the respective tubular members are positioned therein, and the flanged portion of each of said nut means including a plurality of protuberances on the periphery thereof for facilitating hand threading and tightening of said nut means onto said fitting.

References Cited

UNITED STATES PATENTS

| 2,185,725 | 1/1940 | Elliott | 285—177 X |
| 3,091,483 | 5/1963 | Hruby | 285—156 X |

FOREIGN PATENTS

| 214,691 | 4/1958 | Australia. |
| 798,147 | 3/1936 | France. |
| 1,168,677 | 9/1958 | France. |
| 1,176,691 | 11/1958 | France. |
| 556,824 | 2/1957 | Italy. |

EDWARD C. ALLEN, *Primary Examiner.*

THOMAS F. CALLAGHAN, *Examiner.*